US012345073B2

(12) United States Patent
Chen et al.

(10) Patent No.: US 12,345,073 B2
(45) Date of Patent: Jul. 1, 2025

(54) ELECTRONIC LOCK

(71) Applicant: King Slide Technology Co., Ltd., Kaohsiung (TW)

(72) Inventors: Ken-Ching Chen, Kaohsiung (TW); Chun-Ta Liu, Kaohsiung (TW); Hsin-Cheng Su, Kaohsiung (TW); Shu-Chen Lin, Kaohsiung (TW)

(73) Assignee: King Slide Technology Co., Ltd., Kaohsiung (TW)

( * ) Notice: Subject to any disclaimer, the term of this patent is extended or adjusted under 35 U.S.C. 154(b) by 435 days.

(21) Appl. No.: 17/960,236

(22) Filed: Oct. 5, 2022

(65) Prior Publication Data

US 2023/0304323 A1 Sep. 28, 2023

(30) Foreign Application Priority Data

Mar. 25, 2022 (TW) ................................. 111111790

(51) Int. Cl.
*E05B 47/00* (2006.01)
*E05B 47/06* (2006.01)

(52) U.S. Cl.
CPC ...... *E05B 47/0002* (2013.01); *E05B 47/0603* (2013.01); *E05B 2047/0035* (2013.01); *E05B 2047/0037* (2013.01); *E05B 2047/0048* (2013.01)

(58) Field of Classification Search
CPC ...... E05B 65/44; E05B 47/002; E05B 47/003; E05B 47/004; E05B 47/02; E05B 47/026; E05B 2047/0037; E05B 2047/0048; E05B 2047/005; E05B 2047/0054; E05B 2047/0073; E05B 2047/0074; E05B 2047/0077; E05B 65/46
See application file for complete search history.

(56) References Cited

U.S. PATENT DOCUMENTS

| | | | | | |
|---|---|---|---|---|---|
| 2,049,875 | A * | 8/1936 | Singleton | E05G 5/006 | 70/333 R |
| 3,751,086 | A * | 8/1973 | Geringer | E05B 47/0002 | 292/144 |
| 3,872,696 | A * | 3/1975 | Geringer | E05B 47/026 | 70/281 |
| 4,195,442 | A * | 4/1980 | Keeling | G07C 9/00 | 49/35 |

(Continued)

FOREIGN PATENT DOCUMENTS

| | | | |
|---|---|---|---|
| CN | 105496046 | B | 3/2018 |
| EP | 3889380 | A1 | 10/2021 |

(Continued)

*Primary Examiner* — Christine M Mills
*Assistant Examiner* — Faria F Ahmad
(74) *Attorney, Agent, or Firm* — Best & Flanagan LLP

(57) ABSTRACT

An electronic lock includes a control circuit module and an electromagnetic mechanism. The electromagnetic mechanism is electrically connected to the control circuit module, and the electromagnetic mechanism includes a driving member and a magnet. The driving member is configured to be driven by the control circuit module to be located at one of a first position and a second position. When the driving member is not driven by the control circuit module, the driving member is configured to be held at one of the first position and the second position by the magnet.

17 Claims, 16 Drawing Sheets

(56) References Cited

U.S. PATENT DOCUMENTS

| | | | | |
|---|---|---|---|---|
| 5,941,106 | A * | 8/1999 | Williamson, Jr. | E05B 47/026 292/144 |
| 6,003,008 | A * | 12/1999 | Postrel | G06F 1/183 705/16 |
| 7,445,255 | B2 * | 11/2008 | Nye-Hingston | E05B 47/026 292/144 |
| 8,459,433 | B2 * | 6/2013 | Volz | F16H 63/3491 192/220.2 |
| 8,807,605 | B1 * | 8/2014 | Dudley | E05B 47/023 292/201 |
| 9,238,452 | B2 * | 1/2016 | Hyde | F16H 63/3433 |
| 9,797,175 | B2 * | 10/2017 | Brunnmayr | E05F 5/003 |
| 10,858,864 | B2 * | 12/2020 | Pfunder | E05B 17/2011 |
| 10,890,014 | B2 * | 1/2021 | Pukari | G07C 9/00722 |
| 12,084,892 | B2 * | 9/2024 | Hege | E05B 47/0038 |
| 2006/0201214 | A1 * | 9/2006 | Bantle | E05B 47/0673 70/278.7 |
| 2007/0101539 | A1 * | 5/2007 | Sutterlutti | E05F 1/16 16/49 |
| 2008/0277236 | A1 * | 11/2008 | Ruhringer | F16H 63/3475 192/219.6 |
| 2013/0113344 | A1 * | 5/2013 | Elwell | A47B 81/00 312/304 |
| 2013/0325183 | A1 * | 12/2013 | Rahilly | E05B 65/46 700/275 |
| 2015/0115622 | A1 * | 4/2015 | Burdenko | E05B 47/026 307/43 |
| 2017/0049231 | A1 * | 2/2017 | Fellner | A47B 88/463 |
| 2017/0241699 | A1 | 8/2017 | Osbar et al. | |
| 2018/0363328 | A1 * | 12/2018 | Huang | E05B 47/004 |
| 2019/0048621 | A1 * | 2/2019 | Gerhardt | E05B 47/0696 |
| 2019/0277059 | A1 * | 9/2019 | Robertson | E05B 47/0004 |
| 2022/0412124 | A1 * | 12/2022 | Hege | F16P 3/08 |

FOREIGN PATENT DOCUMENTS

| | | | |
|---|---|---|---|
| JP | H04-70705 | U | 6/1992 |
| WO | 2015/189391 | A2 | 12/2015 |
| WO | 2021/064783 | A1 | 4/2021 |

* cited by examiner

ELECTRONIC LOCK

BACKGROUND OF THE INVENTION

1. Field of the Invention

The present invention relates to a lock, and more particularly, to an electronic lock applicable to two objects movable relative to each other.

2. Description of the Prior Art

China patent publication number CN 105496046E discloses a slide rail locking mechanism, which uses an electromagnet to connect to one end of a pressing piece. The other end of the pressing piece is arranged above a press self-locking mechanism with an intermittent locking function, and a latch is arranged below the press self-locking mechanism. The electromagnet can drive the latch through the pressing piece to lock the slide rail.

Combination of the sliding rail locking mechanism disclosed in this case is too complicated and requires many components, such as the electromagnet (comprising an iron core and a spring), the pressing piece, the self-locking mechanism and the latch, to achieve the function of lock.

For different market requirements, sometimes it is not desirable to achieve the function of lock through the aforementioned design. Therefore, it is important to develop various products.

SUMMARY OF THE INVENTION

The present invention provides an electronic lock, which is applicable to a first object and a second object movable relative to each other.

According to an embodiment of the present invention, an electronic lock is applicable to a first object and a second object movable relative to each other. The electronic lock comprises a control circuit module and an electromagnetic mechanism. The electromagnetic mechanism is electrically connected to the control circuit module. The electromagnetic mechanism comprises a coil, a driving member and a magnet. The driving member is configured to be driven by the coil electrified by the control circuit module to be located at one of a first position and a second position. When the second object is located at a predetermined position relative to the first object and when the driving member is located at the first position, the second object is prevented from moving away from the predetermined position. When the second object is located at the predetermined position relative to the first object and when the driving member is located at the second position, the second object is able to move away from the predetermined position. When the coil is not electrified by the control circuit module, the driving member is configured to be held at one of the first position and the second position by the magnet.

According to another embodiment of the present invention, an electronic lock comprises a control circuit module and an electromagnetic mechanism. The electromagnetic mechanism is electrically connected to the control circuit module. The electromagnetic mechanism comprises a driving member and a magnet. The driving member is configured to be driven by the control circuit module to be located at one of a first position and a second position. When the driving member is not driven by the control circuit module, the driving member is configured to be held at one of the first position and the second position by the magnet. The electronic lock further comprises a manual unlocking mechanism. When the driving member is not driven by the control circuit module and when the driving member is located at the first position, the manual unlocking mechanism is configured to drive the driving member to move from the first position to the second position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
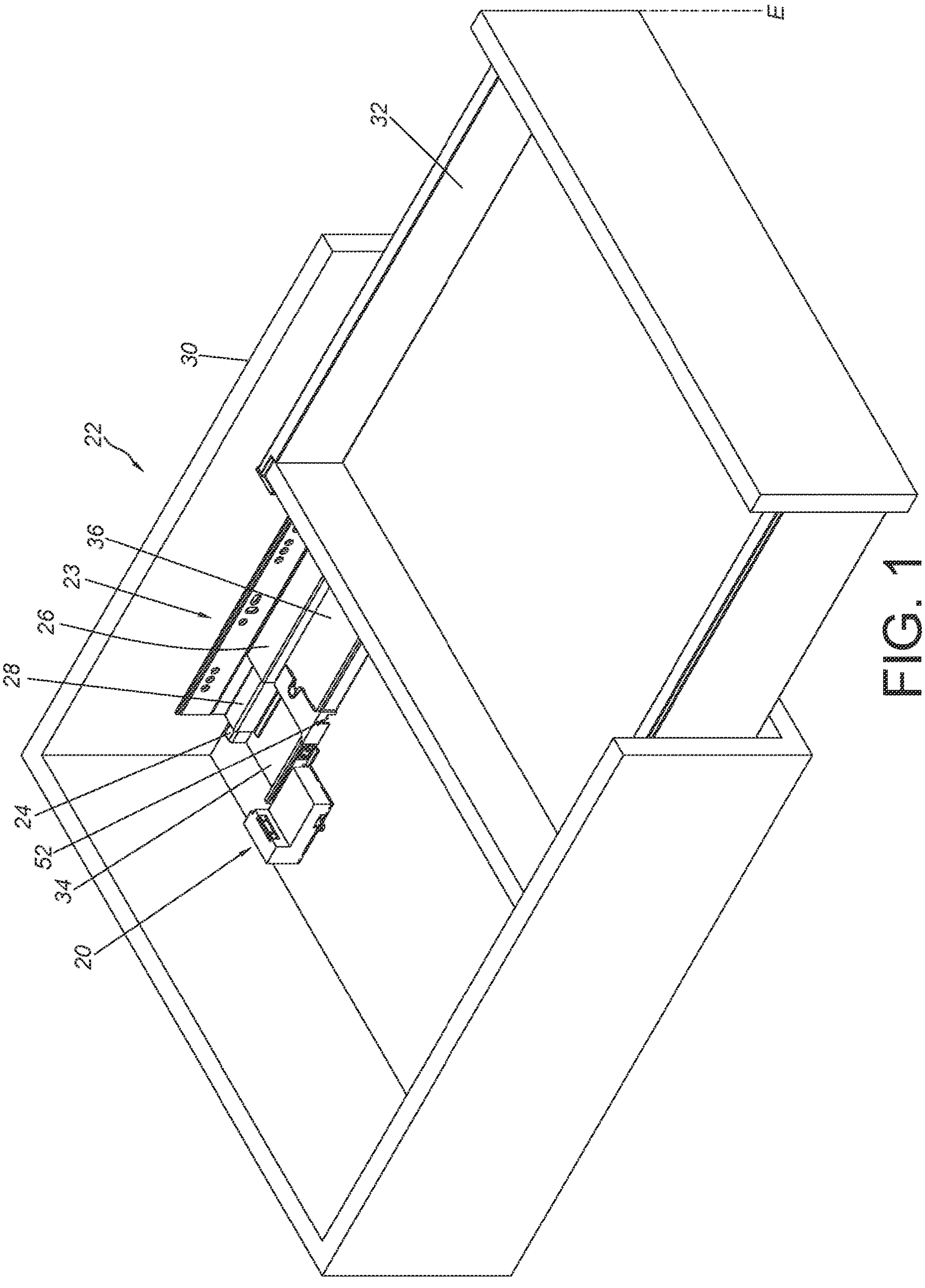
FIG. 1 is a diagram showing an electronic lock applied to a furniture assembly according to an embodiment of the present invention.
Figure 2:
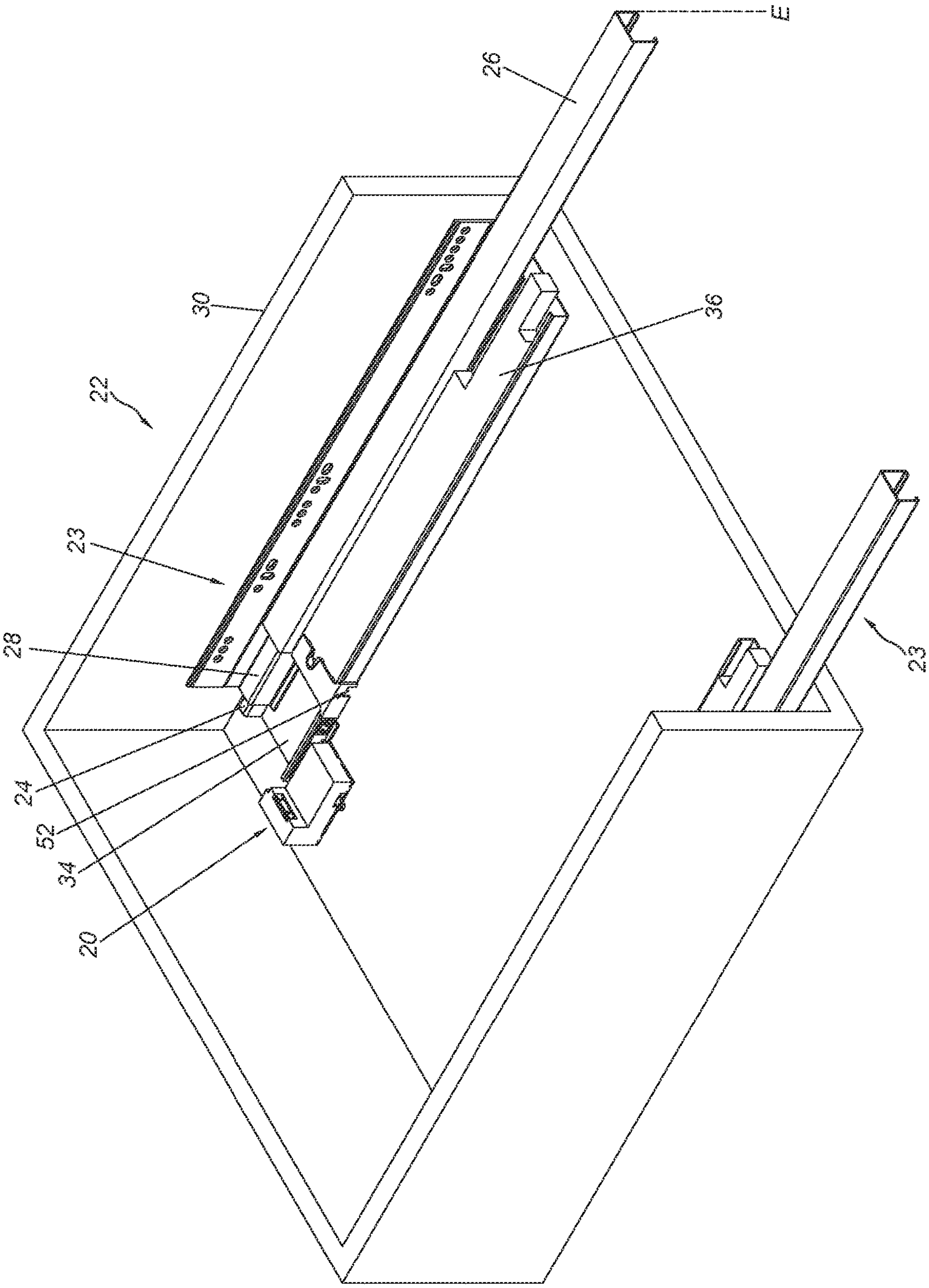
FIG. 2 is a diagram showing the electronic lock applied to the furniture assembly according to an embodiment of the present invention.

As shown in FIG. 1 and FIG. 2, an electronic lock 20 is applicable to a furniture assembly 22 according to an embodiment of the present invention. The furniture assembly 22 comprises a first object 24 and a second object 26 movable relative to each other.

Preferably, the furniture assembly 22 further comprises a third object 28 movably mounted between the first object 24 and the second object 26. In the present embodiment, the first object 24 is a first rail (such as a fixed rail), the second object 26 is a second rail (such as a movable rail), and the third object 28 is a third rail (such as a middle rail), but the present invention is not limited thereto. The first object 24, the second object 26 and the third object 28 are longitudinally movable relative to each other to jointly form a slide rail assembly 23.

Preferably, the first object 24 is arranged (such as fixed) on a cabinet 30, and the second object 26 is configured to carry a drawer 32. The drawer 32 is configured to be located at an extension position E relative to the first object 24 (or the cabinet 30) through the second object 26 as shown in FIG. 1 and FIG. 2.

Preferably, the first object 24 comprises an extension part 34, and the second object 26 comprises a carrying part 36.

Figure 3:
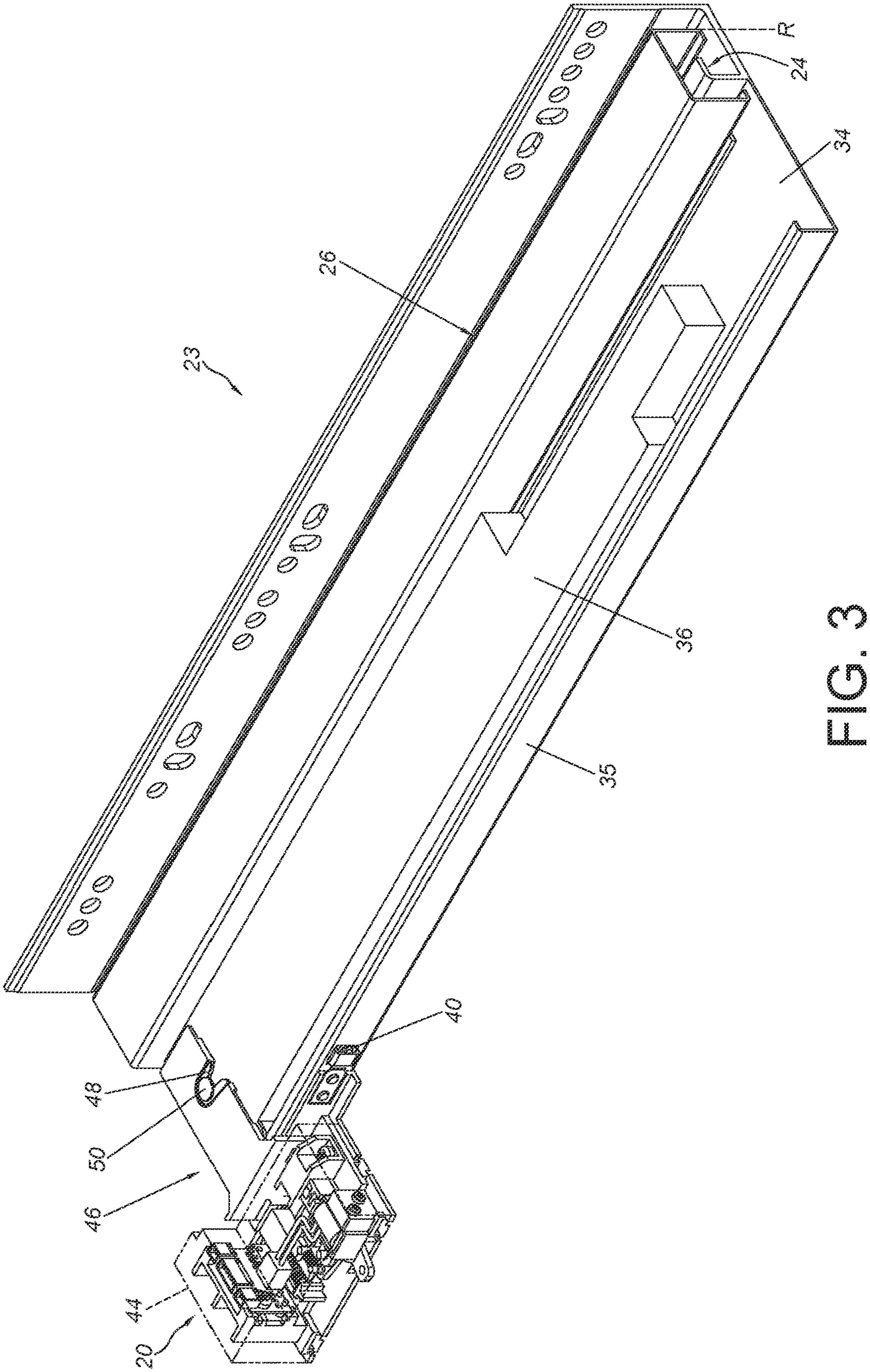
FIG. 3 is a diagram showing the electronic lock applied to a first object and a second object of the furniture assembly movable relative to each other according to an embodiment of the present invention.
Figure 4:
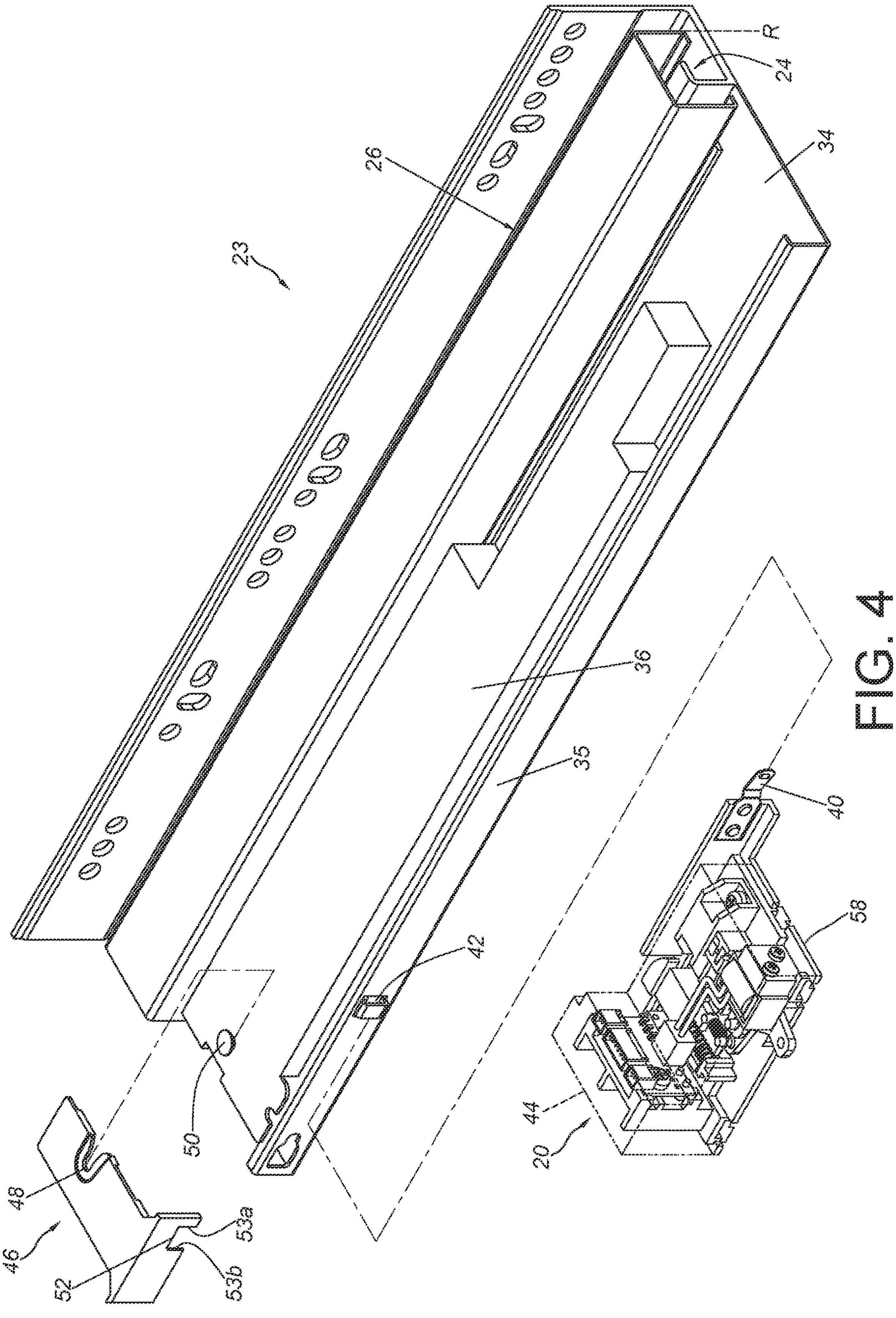
FIG. 4 is an exploded view of the electronic lock applied to the first object and the second object of the furniture assembly movable relative to each other according to an embodiment of the present invention.

As shown in FIG. 3 and FIG. 4, the second object 26 is configured to be located at a predetermined position R (such as a retracted position) relative to the first object 24. When the second object 26 is located at the retracted position, the carrying part 36 of the second object 26 is located at a position substantially corresponding to the extension part 34 of the first object 24 (as shown in FIG. 3).

Preferably, the electronic lock 20 is detachably mounted to the first object 24. For example, the electronic lock 20 has a mounting feature 40, and a side wall 35 of the extension part 34 of the first object 24 has a mounting structure 42 configured to be mutually engaged with the mounting feature 40. In the present embodiment, one of the mounting feature 40 and the mounting structure 42 is a protrusion part, the other one of the mounting feature 40 and the mounting structure 42 is an insertion groove, but the present invention is not limited thereto.

Preferably, the electronic lock 20 has a housing 44 configured to cover most of related parts of the electronic lock 20 for protection.

Preferably, the furniture assembly 22 further comprises a fitting member 46 configured to be detachably mounted to the carrying part 36 of the second object 26. For example, the fitting member 46 has a connecting feature 48, and the carrying part 36 of the second object 26 has a connecting structure 50 configured to be mutually engaged with the connecting feature 48. In the present embodiment, one of the connecting feature 48 and the connecting structure 50 is an engaging groove, and the other of the connecting feature 48 and the connecting structure 50 is a protrusion, but the present invention is not limited thereto.

Preferably, the fitting member 46 further comprises an auxiliary part 52 (as shown in FIG. 4) configured to work with the electronic lock 20. The auxiliary part 52 can be a hole or a groove, but the present invention is not limited thereto.

Figure 5:
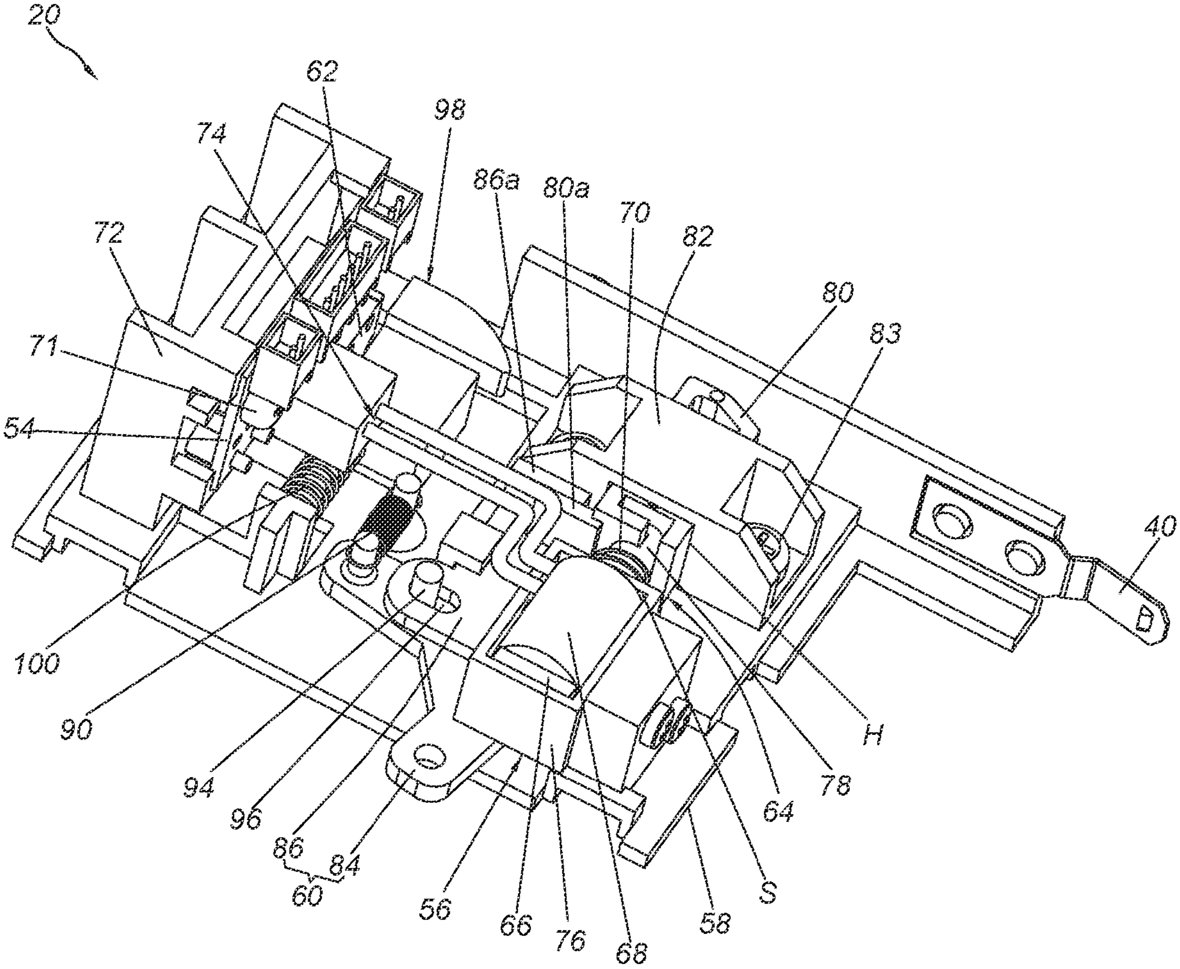
FIG. 5 is a diagram showing the electronic lock according to an embodiment of the present invention.
Figure 6:
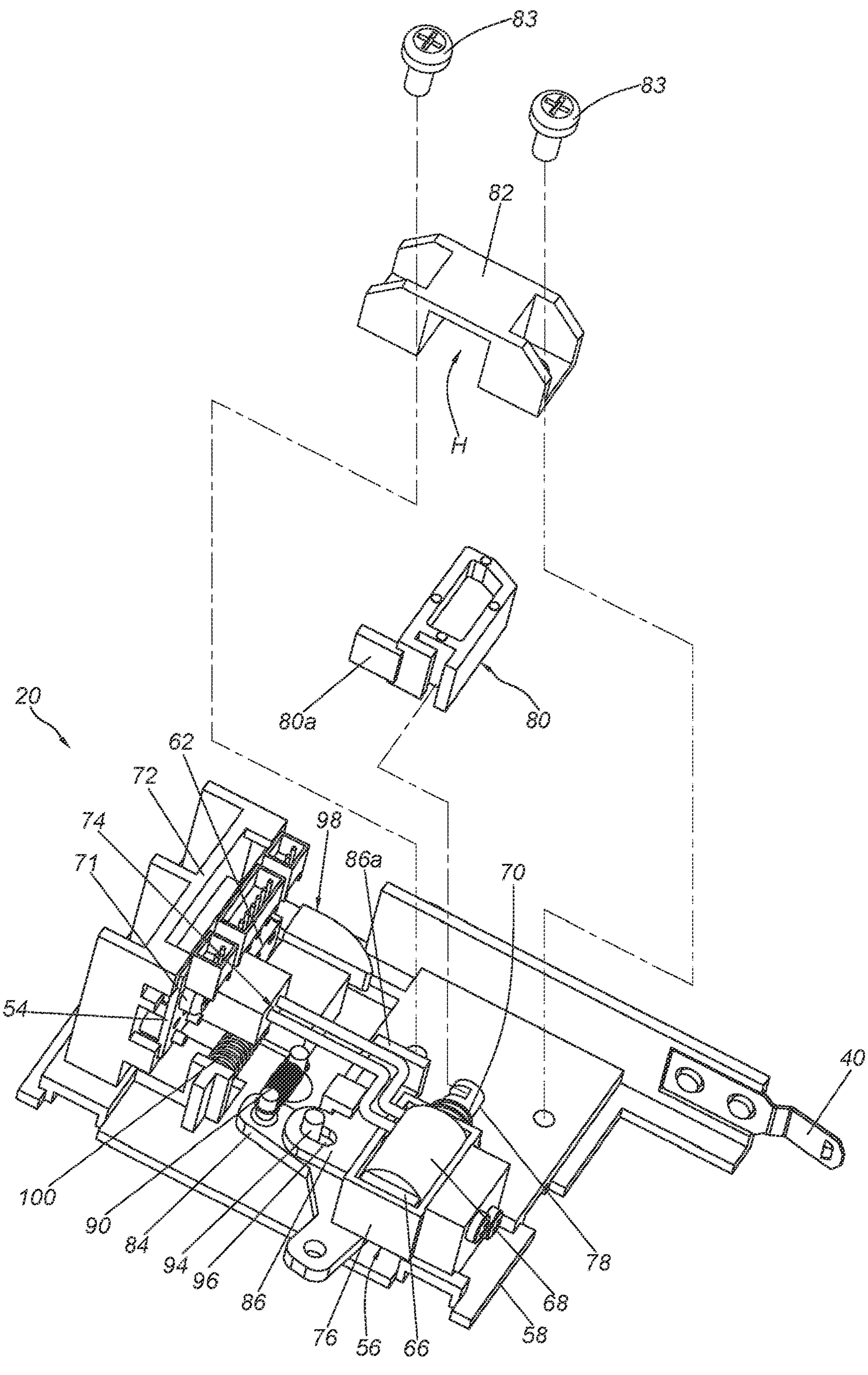
FIG. 6 is an exploded view of the electronic lock according to an embodiment of the present invention.

FIG. 5 and FIG. 6 are figures showing the electronic lock 20 without the housing 44. Furthermore, the electronic lock 20 comprises a control circuit module 54 and an electromagnetic mechanism 56. Preferably, the electronic lock 20 further comprises a base 58, a manual unlocking mechanism 60 and a sensor 62.

The electromagnetic mechanism 56 is electrically connected to the control circuit module 54, and the electromagnetic mechanism 56 comprises a driving member 64 and a magnet 66. Preferably, the electromagnetic mechanism 56 further comprises a coil 68 and an elastic member 70.

Preferably, the control circuit module 54, the electromagnetic mechanism 56, the manual unlocking mechanism 60 and the sensor 62 are all arranged on the base 58. The base 58 has the mounting feature 40. The control circuit module 54 is connected to a fixing part 72 on the base 58 through at least one connecting member 71.

Preferably, the electromagnetic mechanism 56 is electrically connected to the control circuit module 54 through at least one transmission unit 74. The at least one transmission unit 74 can comprise a first wire (cable) and a second wire (cable), but the present invention is not limited thereto.

Preferably, the electromagnetic mechanism 56 further comprises an accommodating member 76. The coil 68 and the magnet 66 are arranged in a space S defined by the accommodating member 76, and the driving member 64 is partially extended out of the space S (as shown in FIG. 5).

Preferably, the magnet 66 is a permanent magnet.

Preferably, the driving member 64 comprises a driving part 78 and a latch part 80. The driving part 78 is made of a metal material. In the present invention, the driving part 78 is an iron core, but the present invention is not limited thereto. The latch part 80 is connected (such as fixedly connected) to the driving part 78, such that the latch part 80 and the driving part 78 can be seen as one piece, and the latch part 80 has an extension section 80*a*. In other embodiments, the latch part 80 can be integrated with the driving part 78, but the present invention is not limited thereto.

Preferably, the elastic member 70 is sleeved on the driving part 78 of the driving member 64, and the elastic member 70 is arranged between the accommodating member 76 and the latch part 80.

Figure 9:
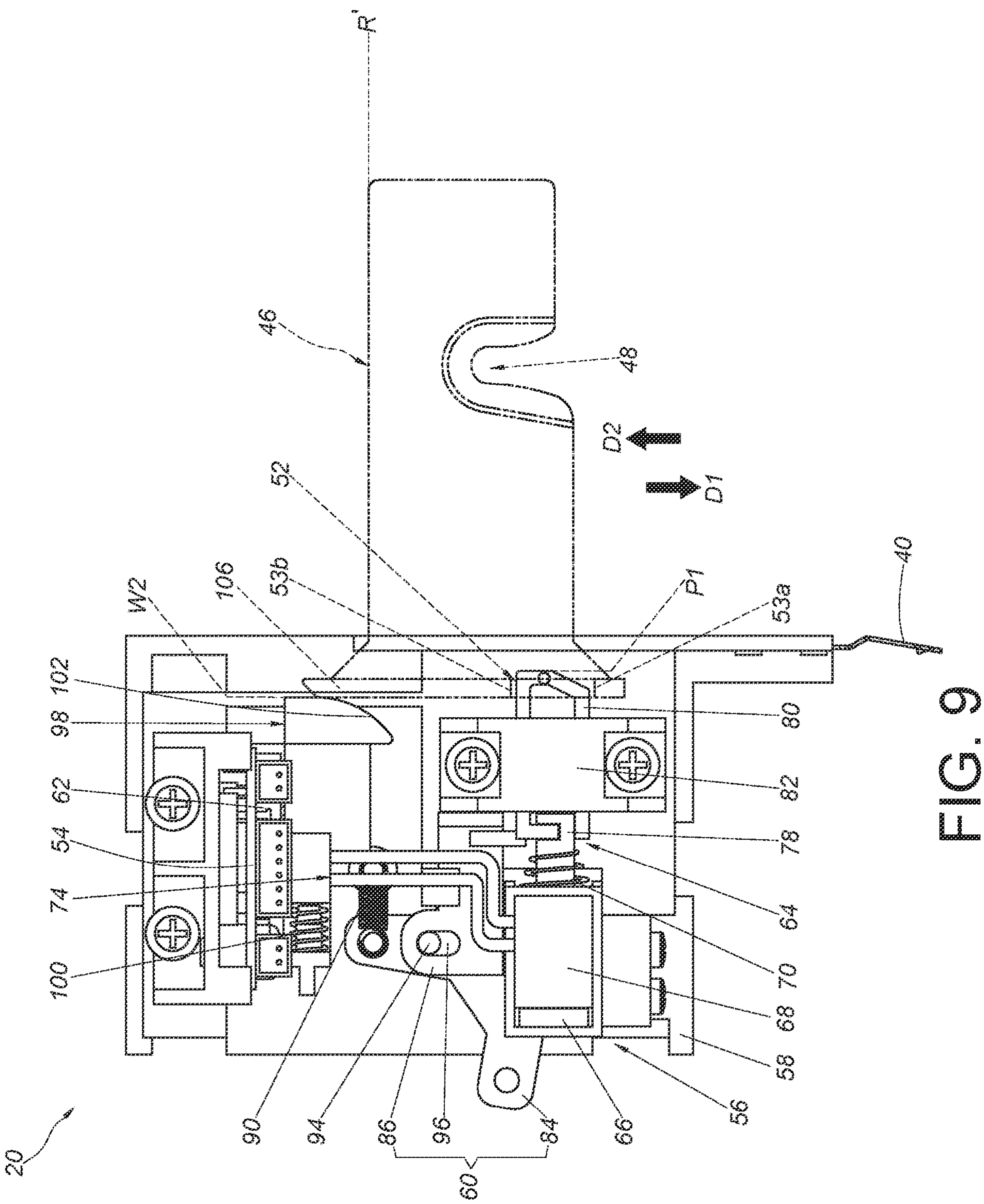
FIG. 9 is a diagram showing the second object of the electronic lock being located at a predetermined position relative to the first object, and a driving member of the electronic lock being located at a first position according to an embodiment of the present invention.

Preferably, the electromagnetic mechanism 56 further comprises an auxiliary base 82, and the auxiliary base 82 is connected to the base 58 through at least one connecting component 83. The latch part 80 of the driving member 64 is configured to pass through an opening H of the auxiliary base 82. The auxiliary base 82 is configured to assist the driving member 64 in preventing the second object 26 from being moved away from the predetermined position R when the driving member 64 is located at a first position P1 (as shown in FIG. 9).

Figure 7:
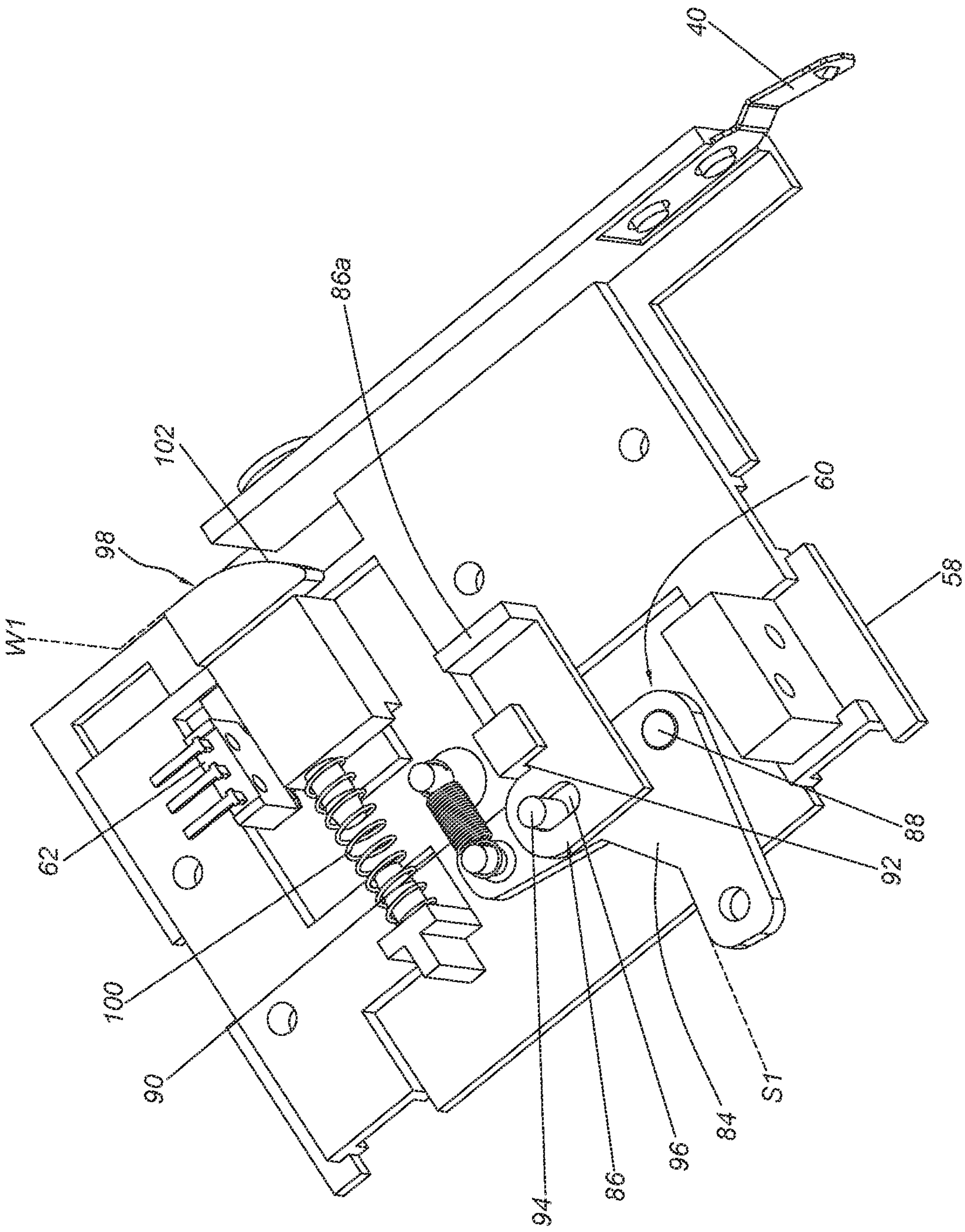
FIG. 7 is a diagram showing a manual unlocking mechanism of the electronic lock according to an embodiment of the present invention.

FIG. 7 is a diagram showing the electronic lock 20 without the housing 44, the control circuit module 54 and the electromagnetic mechanism 56.

The manual unlocking mechanism 60 comprises a first member 84 and a second member 86. The first member 84 is movably mounted on the base 58. For example, the first member 84 is pivotally connected to the base 58 through a shaft 88, and an auxiliary elastic member 90 is configured to provide an elastic force to the first member 84 to hold the first member 84 in an initial state S1. On the other hand, the second member 86 is movably mounted on the base 58. For example, the second member 86 is movable relative to the base 58 through a holding feature 92 on the base 58, and the holding feature 92 is an extended passage, so that the second member 86 is linearly movable relative to the base 58. A direction of linear movement of the second member 86 is substantially perpendicular to a direction of longitudinal relative movement between the second object 26 and the first object 24.

Preferably, the first member 84 and the second member 86 are configured to work with each other through a first predetermined feature 94 and a second predetermined feature 96. For example, one of the first predetermined feature 94 and the second predetermined feature 96 is a protrusion, the other one of the first predetermined feature 94 and the second predetermined feature 96 is an elongated hole (or an elongated groove), and the protrusion pass through a portion of the elongated hole, but the present invention is not limited thereto (as shown in FIG. 7).

Preferably, a corresponding section 86*a* of the second member 86 is adjacent to the extension section 80*a* of the latch part 80 (as shown in FIG. 5).

Preferably, the electronic lock 20 further comprises a slider 98 and an elastic feature 100 arranged on the base 58. The elastic feature 100 is configured to provide an elastic force to the slider 98, so as to hold the slider 98 in a first state W1. The slider 98 comprises a guiding part 102 (such as an inclined surface or an arc surface), and the sensor 62 is configured to work with the slider 98 (as shown in FIG. 7). Preferably, the sensor 62 is electrically connected to the control circuit module 54.

Figure 8:
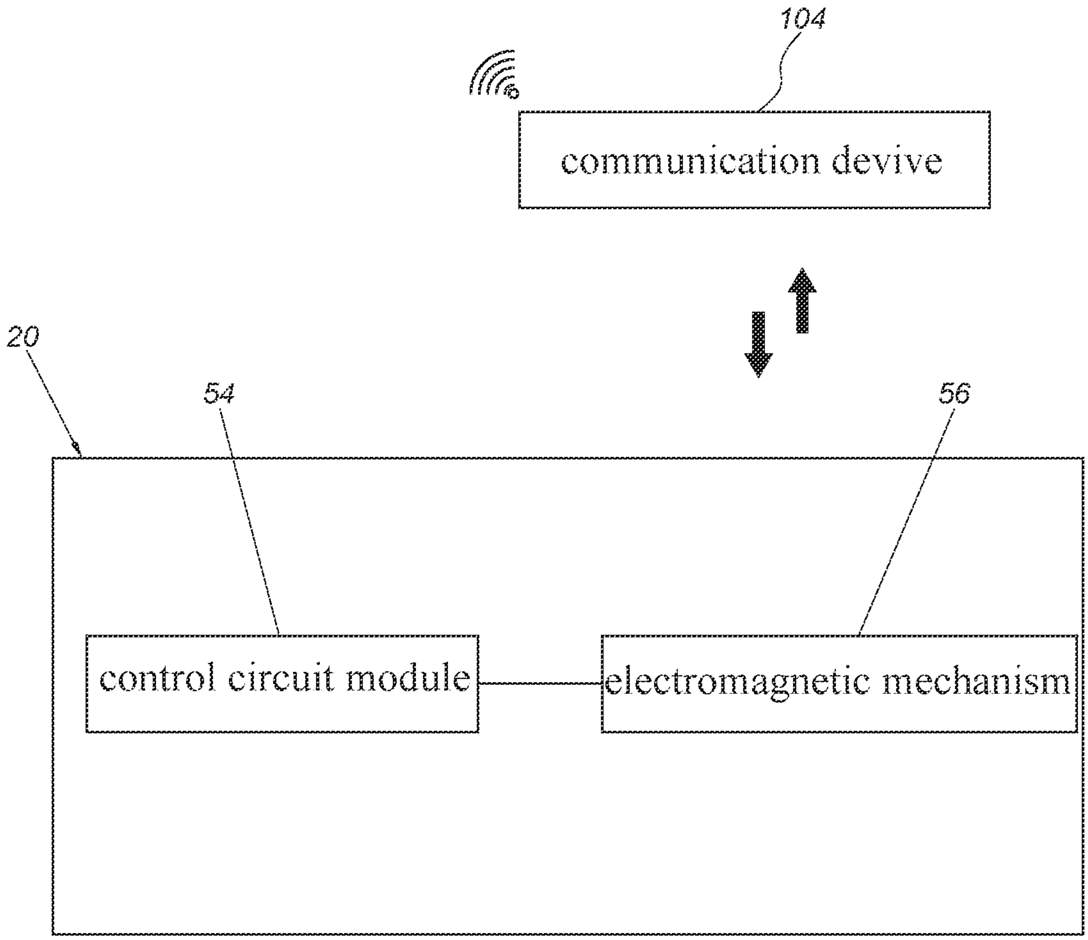
FIG. 8 is a block diagram showing the electronic lock being in communication connection with a communication device according to an embodiment of the present invention.

As shown in FIG. 8, the electronic lock 20 is configured to work with a communication device 104. The control circuit module 54 is electrically connected to the electromagnetic mechanism 56. The communication device 104 is configured to communicate with the electronic lock 20 through wired or wireless communication. The communication device 104 can be a mobile phone, a tablet or a smart watch, but the present invention is not limited thereto.

Figure 11:
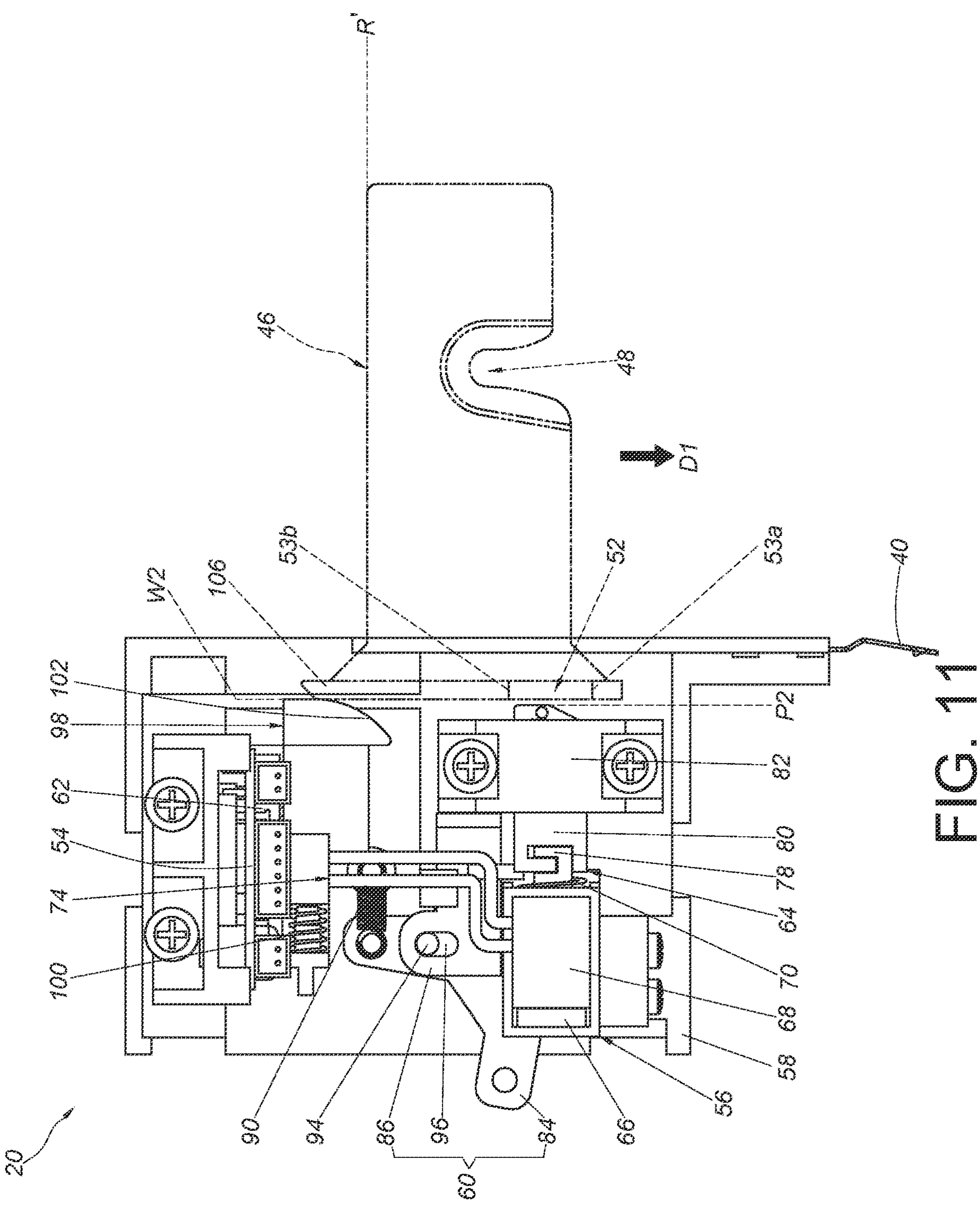
FIG. 11 is a diagram showing the second object of the electronic lock being located at the predetermined position relative to the first object, and the driving member of the electronic lock being located at a second position according to an embodiment of the present invention.

As shown in FIG. 9, the driving member 64 is configured to be driven by the control circuit module 54 to be located at the first position P1 (as shown in FIG. 9) or a second position P2 (please refer to FIG. 11). For example, the driving member 64 is configured to be driven by the coil 68 electrified by the control circuit module 54 to be located the first position P1 or the second position P2. As show in FIG. 9, when the second object 26 (the fitting member 46 represents the second object 26 in FIG. 9) is located at a predetermined position R (the fitting member 46 is located at a predetermined position R' relative to the electronic lock 20 as shown in FIG. 9) relative to the first object 24 (the electronic lock 20 represents the first object 24 in FIG. 9) and when the driving member 64 is located at the first position P1, the second object 26 is prevented from moving away from the predetermined position R.

Specifically, when the second object 26 is located at the predetermined position R and when the driving member 64 is located at the first position P1 (such as a locking position), the latch part 80 of the driving member 64 is extended into the auxiliary part 52 (such as a hole or a groove) of the fitting member 46, and the latch part 80 blocks a first blocking feature 53*a* (or a second blocking feature 53*b*) of the auxiliary part 52 to prevent the second object 26 from moving away from the predetermined position R relative to the first object 24 along an opening direction D1 (or a retraction direction D2).

Preferably, the driving member 64 is configured to be driven to be located at the first position P1 when the control circuit module 54 provides a first power signal. For example, the driving member 64 is configured to be driven to be located at the first position P1 when the control circuit module 54 provides the first power signal to the coil 68. Furthermore, the control circuit module 54 is configured to provide the first power signal (such as reverse voltage, but the present invention is not limited thereto) to the coil 68 through the at least one transmission unit 74 to drive the driving member 64 to be located at the first position P1.

Preferably, when the driving member 64 is not driven by the control circuit module 54, the driving member 64 is configured to be held at the first position P1 by the elastic member 70. For example, when the coil 68 is not electrified by the control circuit module 54 and when the driving member 64 is located at the first position P1, the driving member 64 is configured to be held at the first position P1 by the elastic force of the elastic member 70, so as to save power.

Preferably, when the fitting member 46 (represents the second object 26 in FIG. 9) is located at a predetermined position R' relative to the electronic lock 20 (represents the first object 24 in FIG. 9), a predetermined wall 106 of the fitting member 46 is configured to press the slider 98 to hold the slider 98 in a second state W2, such that the elastic feature 100 accumulates an elastic force.

Figure 10:
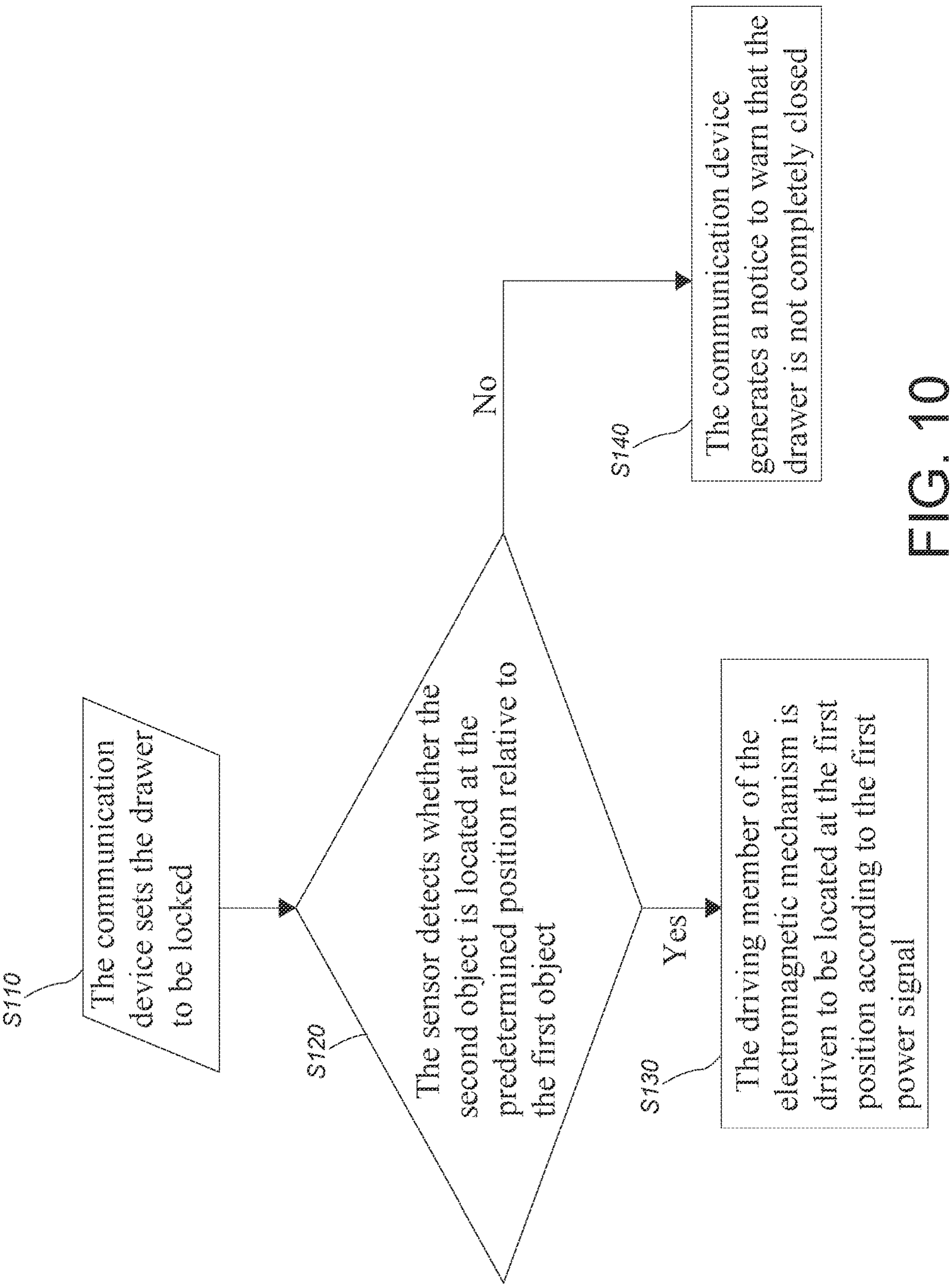
FIG. 10 is a flowchart of a first operation process of the electronic lock applied to the furniture assembly according to an embodiment of the present invention.

FIG. 10 is a flow chart of a first operation process of the electronic lock 20 according to an embodiment of the present invention. The flow chart of the first operation process of the electronic lock 20 comprises the following steps:

Step S110: The communication device 104 sets the drawer 32 to be locked.

In Step S110, the communication device 104 is installed with an application (APP), such that a user can send a first control signal, such as a locking signal, through the application of the communication device 104.

Step S120: The sensor 62 detects whether the second object 26 is located at the predetermined position R relative to the first object 24.

In Step S120, as shown in FIG. 9, the electronic lock 20 is configured to detect whether the sensor 62 is in a normally open (NO) state, in order to determine whether the second object 26 is located at the predetermined position R relative to the first object 24. For example, when the predetermined wall 106 of the fitting member 46 presses the slider 98 to hold the slider 98 in the second state W2, the sensor 62 is in the normally open state. Meanwhile, the second object 26 is located at the predetermined position R relative to the first object 24. Therefore, the sensor 62 can be used for detecting whether the second object 26 is located at the predetermined position R relative to the first object 24. In other embodiments of the present invention, when the slider 98 is held in the second state W2, the sensor 62 can be in a normally closed (NC) state, in order to determine whether the second object 26 is located at the predetermined position R relative to the first object 24.

If the sensor 62 is in the normally open (NO) state, Step S130 is performed. Step S130: The driving member 64 of the electromagnetic mechanism 56 is driven to be located at the first position P1 according to the first power signal. In step S130, when the electronic lock 20 receives the first control signal of the communication device 104, the control circuit module 54 provides the first power signal (such as reverse voltage, but the present invention is not limited thereto) to the coil 68 to drive the driving member 64 to be located the first position P1 (as shown in FIG. 9), so as to prevent the drawer 32 from being opened. In step S130, when the second object 26 (the drawer 32) is located at the predetermined position R relative to the first object 24 (the cabinet 30) and when the driving member 64 is located at the first position P1 (as shown in FIG. 9), the drawer 32 is prevented from being opened along the opening direction D1.

If the sensor 62 is not in the normally open (NO) state, Step S140 is performed. Step 140: The communication device 104 generates a notice to warn that the drawer 32 is not completely closed. In Step S140, the communication device 104 can generate a sound and/or an electronic message through the application to inform the user that the drawer 32 is not completely located at the predetermined position R now.

Figure 12:
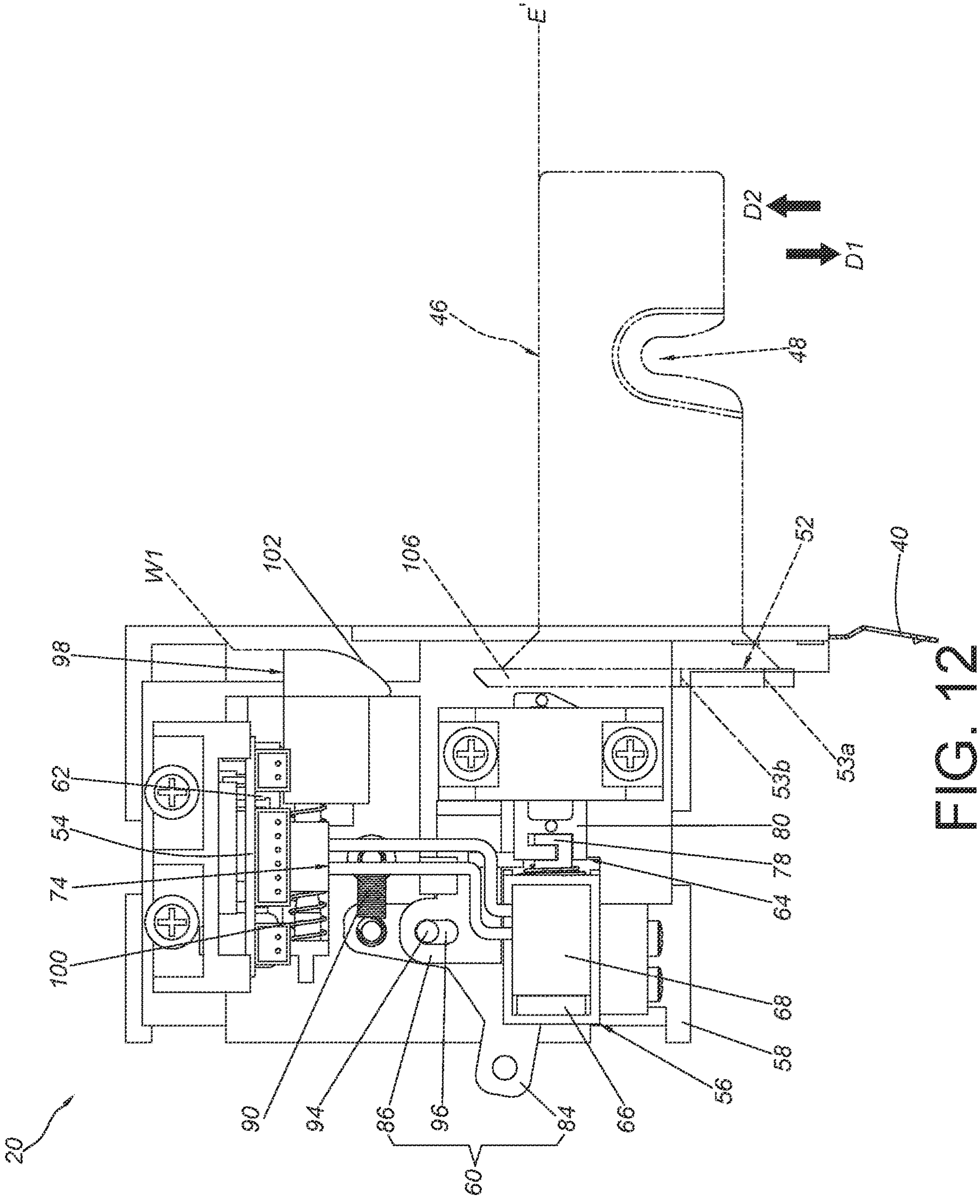
FIG. 12 is a diagram showing the second object of the electronic lock being moved away from the predetermined position relative to the first object according to an embodiment of the present invention.

As shown in FIG. 11 and FIG. 12, the driving member 64 is driven to be located at the second position P2 when the coil 68 is electrified by the control circuit module 54. When the second object 26 (the fitting member 46 represents the second object 26 in FIG. 11 and FIG. 12) is located at the predetermined position R (the fitting member 46 is located at the predetermined position R' relative to the electronic lock 20 as shown in FIG. 11) relative to the first object 24 (the electronic lock 20 represents the first object 24 in FIG. 11 and FIG. 12) and when the driving member 64 is located at the second position P2, the second object 26 is able to move away from the predetermined position R.

Specifically, when the second object 26 is located at the predetermined position R relative to the first object 24 (the fitting member 46 is located at the predetermined position R' relative to the electronic lock 20 as shown in FIG. 11) and when the driving member 64 is located at the second position P2 (such as an unlocking position), the latch part 80 of the driving member 64 is not extended into the auxiliary part 52 (such as a hole or a groove) of the fitting member 46, so as to allow the second object 26 to move away from the predetermined position R relative to the first object 24 along the opening direction D1. For example, the second object 26 can be moved to the extension position E along the opening direction D1 (the fitting member 46 is located at the predetermined extension position E' relative to the electronic lock 20 as shown in FIG. 12).

Preferably, the driving member 64 is configured to be driven to be located at the second position P2 when the control circuit module 54 provides a second power signal. For example, the driving member 64 is configured to be driven to be located at the second position P2 when the control circuit module 54 provides the second power signal to the coil 68. Furthermore, the control circuit module 54 is configured to provide the second power signal (such as forward voltage, but the present invention is not limited thereto) to the coil 68 through the at least one transmission unit 74 to drive the driving member 64 to be located at the second position P2.

Preferably, when the driving member 64 is not driven by the control circuit module 54, the magnet 66 is configured to hold the driving member 64 located at the second position P2. For example, when the coil 68 is not electrified by the control circuit module 54 and when the driving member 64 is located at the second position P2, the driving member 64 is attracted by the magnet 66 to be held at the second position P2, so as to save power.

Preferably, when the second object 26 is located at the extension position E relative to the first object 24 (the fitting member 46 represents the second object 26 and is located at the predetermined extension position E' relative to the electronic lock 20 in FIG. 12), the predetermined wall 106 of the fitting member 46 no longer presses the slider 98, such that the slider 98 returns to the first state W1 from the second state W2 in response to the elastic force released by the elastic feature 100.

Moreover, one of the slider 98 and the fitting member 46 comprises the guiding part 102. In the present embodiment, both the slider 98 and the fitting member 46 have the guiding parts (FIG. 12 only shows the guiding part 102 of the slider 98). During a process of the second object 26 being moved from an extension position, such as the extension position E (the fitting member 46 is correspondingly located the predetermined extension position E' as shown in FIG. 12), to the predetermined position R along the retraction direction D2, the fitting member 46 can easily push the slider 98 to move through the guiding part 102, so that the predetermined wall 106 of the fitting member 46 is configured to press the slider 98 again (as shown in FIG. 11).

Figure 13:
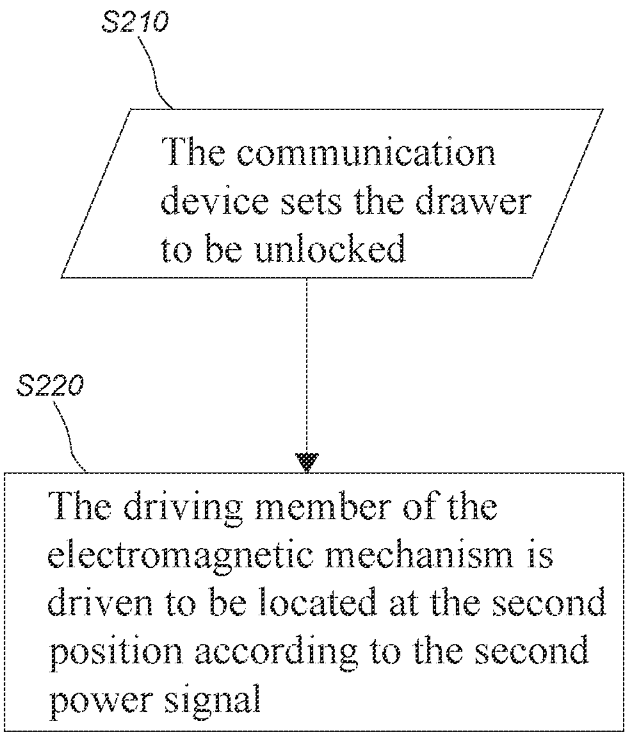
FIG. 13 is a flowchart of a second operation process of the electronic lock applied to the furniture assembly according to an embodiment of the present invention.

FIG. 13 is a flowchart of a second operation process of the electronic lock 20 according to an embodiment of the present invention. The flowchart of the second operation process of the electronic lock 20 comprises the following steps:

Step S210: The communication device 104 sets the drawer 32 to be unlocked.

In Step S210, the user can send a second control signal, such as an unlocking signal, through the application of the communication device 104.

Step S220: The driving member 64 of the electromagnetic mechanism 56 is driven to be located at the second position P2 according to the second power signal. In step S220, when the electronic lock 20 receives the second control signal of the communication device 104 and when the second object 26 (the drawer 32) is located at the predetermined position R relative to the first object 24 (the cabinet 30) (as shown in FIG. 11), the driving member 64 is driven to be located at the second position P2 according to the second power signal (such as forward voltage, but the present invention is not limited thereto) provided by the control circuit module 54 to the coil 68, such that the drawer 32 is able to be opened. In step S220, when the second object 26 (the drawer 32) is located at the predetermined position R relative to the first object 24 (the cabinet 30) and when the driving member 64 is located at the second position P2 (as shown in FIG. 11), the drawer 32 is able to be opened along the opening direction D1 (as shown in FIG. 12).

Figure 14:
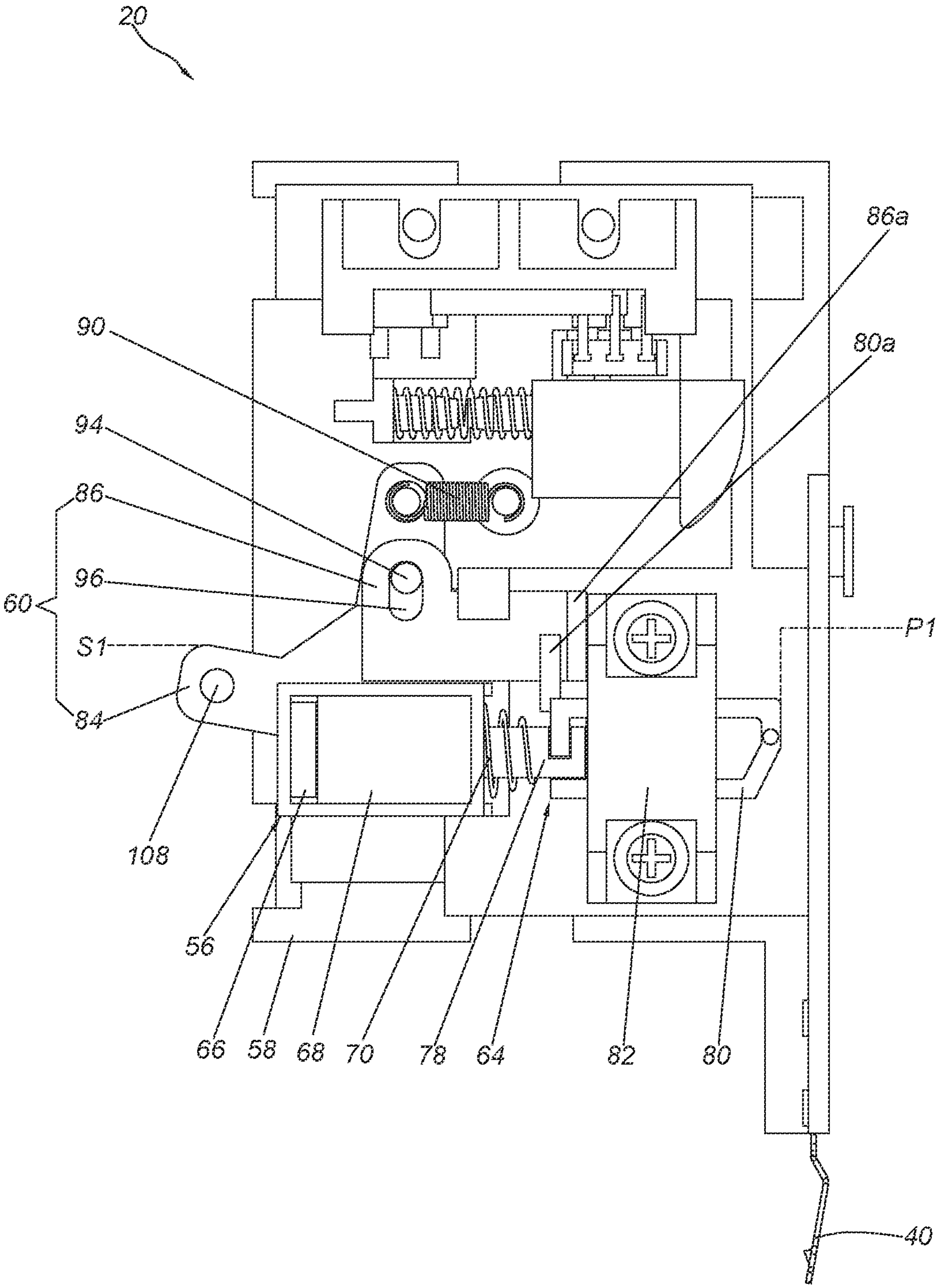
FIG. 14 is a diagram showing a first movement of the driving member being driven to move from the first position to the second position through the manual unlocking mechanism when the electronic lock is not electrified according to an embodiment of the present invention.
Figure 15:
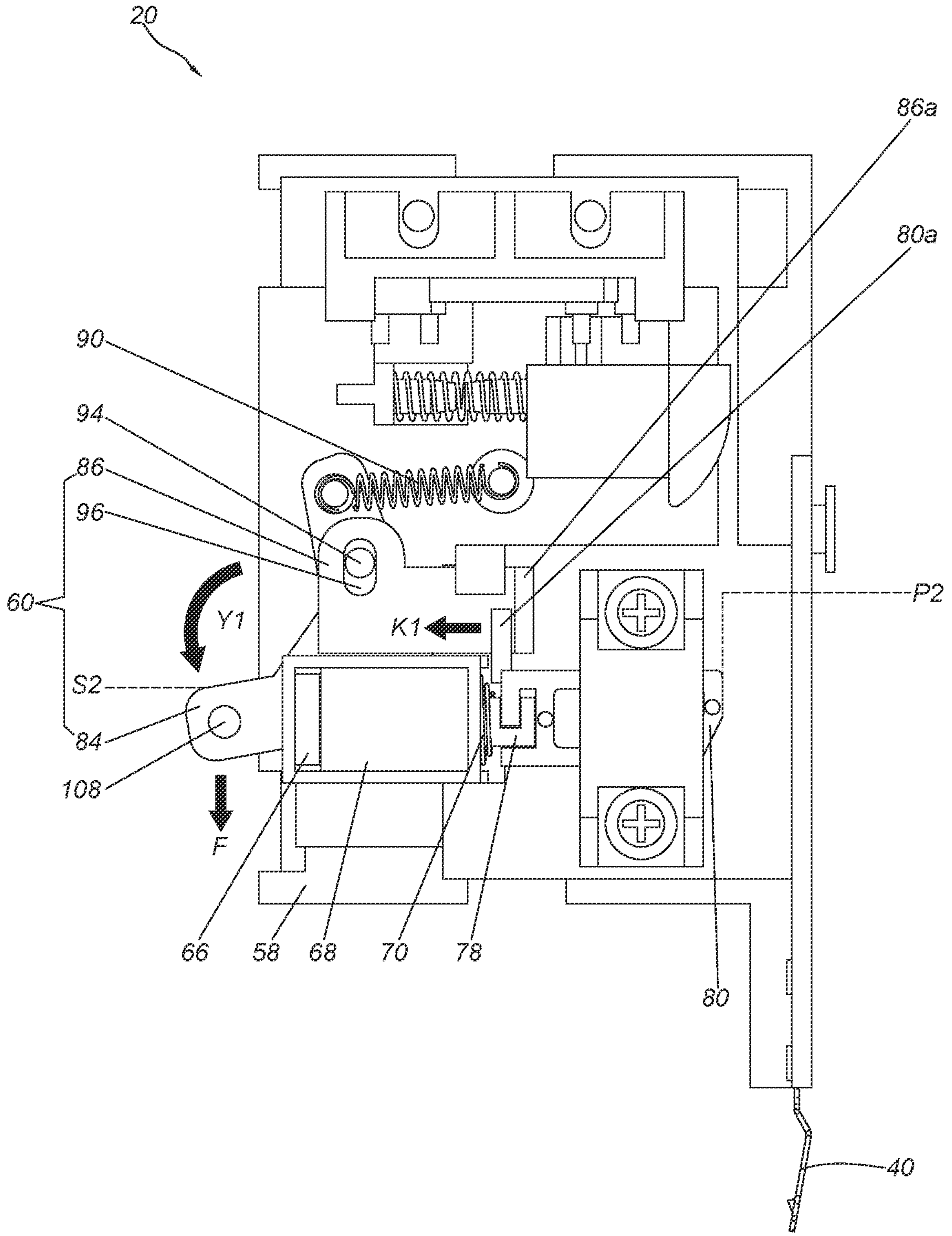
FIG. 15 is a diagram showing a second movement of the driving member being driven to move from the first position to the second position through the manual unlocking mechanism when the electronic lock is not electrified according to an embodiment of the present invention.

As shown in FIG. 14 and FIG. 15, when the coil 68 is not electrified by the control circuit module 54 and when the driving member 64 is located at the first position P1, the manual unlocking mechanism 60 is configured to drive the driving member 64 to move from the first position P1 (such as a locking position as shown in FIG. 14) to the second position P2 (such as an unlocking position as shown in FIG. 15).

For example, the user can apply a force F to the first member 84 along a predetermined direction (such as the opening direction D1), such that the first member 84 is configured to drive the second member 86 to move together, to further drive the driving member 64 to move from the first position P1 (as shown in FIG. 14) to the second position P2 (as shown in FIG. 15). Preferably, the first member 84 has a mounting part 108 (such as a hole, but the present invention is not limited thereto) configured to be tied with a rope for allowing the user to apply the force F.

Moreover, the predetermined direction is substantially parallel to a direction of relative movement between the first object 24 and the second object 26. For example, the predetermined direction is a longitudinal direction, and a moving direction of the second object 26 relative to the first object 24 is also a longitudinal direction.

Preferably, the first member 84 is configured to be rotated to drive the second member 86 to move linearly. For example, when the user applies the force F to the first member 84 along the predetermined direction, the first member 84 is moved from the initial state S1 (as shown in FIG. 14) along a first rotating direction Y1 to a swing state S2 (as shown in FIG. 15), such that the first member 84 can drive the second member 86 to move linearly relative to the base 58 along a first moving direction K1. In addition, the corresponding section **86*a* of the second member 86 is configured to contact with the extension section 80*a* of the latch part 80 of the driving member 64, so as to drive the driving member 64 to move from the first position P1 (as shown in FIG. 14) to the second position P2 (as shown in FIG. 15), and the auxiliary elastic member 90 is configured to accumulate an elastic force at the meantime (as shown in FIG. 15**).

Figure 16:
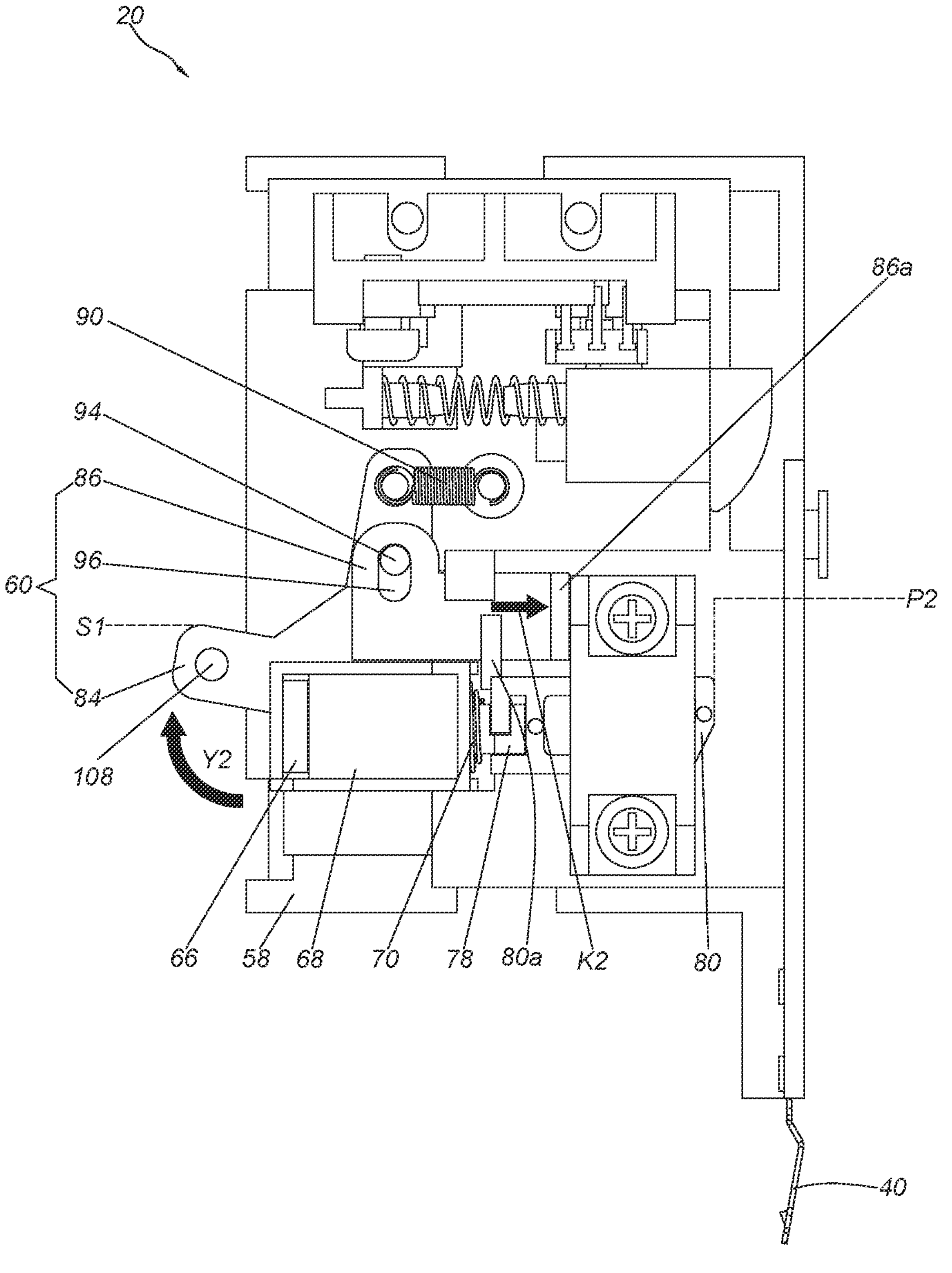
FIG. 16 is a diagram showing a third movement of the driving member being driven to move from the first position to the second position through the manual unlocking mechanism when the electronic lock is not electrified according to an embodiment of the present invention.

As shown in FIG. 15 and FIG. 16, when the user stops applying the force F to the first member 84, the first member 84 is moved along a second rotating direction Y2 from the swing state S2 (as shown in FIG. 15) to the initial state S1 (as shown in FIG. 16). During such process, the first member drives the second member 86 to move along a second moving direction K2 to the initial position. The second rotating direction Y2 is opposite to the first rotating direction Y1, and the second moving direction K2 is opposite to the first moving direction K1.

Therefore, the electronic lock 20 according to embodiments of the present invention has the following technical features:

When the coil 68 is not electrified by the control circuit module 54, the driving member 64 can be held at the second position P2 by the magnet 66, so as to save power; or when the coil 68 is not electrified by the control circuit module 54, the driving member 64 can be held at the first position P1 by the elastic member 70, so as to save power.

When the coil 68 is not electrified by the control circuit module 54 and when the driving member 64 is located at the first position P1, the driving member 64 is configured to be driven to move from the first position P1 (such as the locking position) to the second position P2 (such as the unlocking position) through applying the force to the first member 84 of the manual unlocking mechanism 60 along a predetermined direction to drive the second member 86 to move. The predetermined direction is substantially parallel to the direction of the relative movement between the first object 24 and the second object 26, so as to increase convenience of use.

In contrast to the prior, the electromagnetic mechanism 56 according to embodiments of the present invention can have a simpler structure to achieve locking and unlocking functions through the driving part 78, the latch part 80 and the magnet 66 (or the elastic member 70).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic lock, applicable to a first object and a second object movable relative to each other, the electronic lock comprising:

a control circuit module; and an electromagnetic mechanism electrically connected to the control circuit module, the electromagnetic mechanism comprising:

a coil;

a driving member configured to be driven by the coil electrified by the control circuit module to be located at one of a first position and a second position; and a magnet;

wherein when the second object is located at a predetermined position relative to the first object and when the driving member is located at the first position, the second object is prevented from moving away from the predetermined position;

wherein when the second object is located at the predetermined position relative to the first object and when the driving member is located at the second position, the second object is able to move away from the predetermined position;

wherein when the coil is not electrified by the control circuit module, the driving member is configured to be held at one of the first position and the second position by the magnet;

wherein the electronic lock further comprises a manual unlocking mechanism; wherein when the coil is not electrified by the control circuit module and the driving member is located at the first position, the manual unlocking mechanism is configured to drive the driving member to move from the first position to the second position;

wherein the manual unlocking mechanism comprises a first member and a second member; wherein when a force is applied to the first member along a predetermined direction, the first member is configured to drive the second member to move together, to further drive the driving member to move from the first position to the second position.

2. The electronic lock of claim 1, wherein the electromagnetic mechanism further comprises an elastic member; wherein when the coil is not electrified by the control circuit module, the driving member is configured to be held at the other one of the first position and the second position by the elastic member.

3. The electronic lock of claim 1, wherein the driving member comprises metal material.

4. The electronic lock of claim 1, wherein the magnet is a permanent magnet.

5. The electronic lock of claim 1, wherein the driving member is driven to be located at the first position when the control circuit module provides a first power signal to the coil; wherein the driving member is driven to be located at the second position when the control circuit module provides a second power signal to the coil.

6. The electronic lock of claim 1, wherein the predetermined direction is substantially parallel to a direction of relative movement between the first object and the second object.

7. The electronic lock of claim 1, further comprising a base, wherein the electromagnetic mechanism and the manual unlocking mechanism are both arranged on the base; wherein the first member is configured to be rotated to drive the second member to move linearly.

8. The electronic lock of claim 7, further comprising a sensor configured to detect whether the second object is located at the predetermined position relative to the first object.

9. The electronic lock of claim 5, wherein when the electronic lock receives a first control signal transmitted from a communication device, the control circuit module provides the first power signal to the coil to drive the driving member to be located at the first position; wherein when the electronic lock receives a second control signal transmitted from the communication device and when the second object is located at the predetermined position relative to the first object, the control circuit module provides the second power signal to the coil to drive the driving member to be located at the second position.

10. An electronic lock, comprising:

a control circuit module; and an electromagnetic mechanism electrically connected to the control circuit module, the electromagnetic mechanism comprising:

a driving member configured to be driven by the control circuit module to be located at one of a first position and a second position; and a magnet;

wherein when the driving member is not driven by the control circuit module, the driving member is configured to be held at one of the first position and the second position by the magnet;

wherein the electronic lock further comprises a manual unlocking mechanism; wherein when the driving member is not driven by the control circuit module and when the driving member is located at the first position, the manual unlocking mechanism is configured to drive the driving member to move from the first position to the second position;

wherein the manual unlocking mechanism comprises a first member and a second member; wherein when a force is applied to the first member along a predetermined direction, the first member is configured to drive the second member to move together, to further drive the driving member to move from the first position to the second position.

11. The electronic lock of claim 10, further comprising a base, wherein the electromagnetic mechanism and the manual unlocking mechanism are both arranged on the base; wherein the first member is configured to be rotated to drive the second member to move linearly.

12. The electronic lock of claim 10, wherein the electromagnetic mechanism further comprises an elastic member; wherein when the driving member is not driven by the control circuit module, the driving member is configured to be held at the other one of the first position and the second position by the elastic member.

13. The electronic lock of claim 10, wherein the driving member comprises metal material.

14. The electronic lock of claim 10, wherein the magnet is a permanent magnet.

15. The electronic lock of claim 10, wherein the driving member is configured to be located at the first position when the control circuit module provides a first power signal to the electromagnetic mechanism; wherein the driving member is configured to be located at the second position when the control circuit module provides a second power signal to the electromagnetic mechanism.

16. The electronic lock of claim 15, wherein when the electronic lock receives a first control signal transmitted from a communication device, the control circuit module provides the first power signal to the electromagnetic mechanism to drive the driving member to be located at the first position.

17. The electronic lock of claim 16, wherein when the electronic lock receives a second control signal transmitted from the communication device, the control circuit module provides the second power signal to the electromagnetic mechanism to drive the driving member to be located at the second position.

* * * * *